United States Patent
Ye et al.

(10) Patent No.: US 11,539,714 B2
(45) Date of Patent: Dec. 27, 2022

(54) ASSIGNING CATEGORIES FOR MESSAGES AND SYMMETRIC KEY PER CATEGORY TO LOCALIZE THE IMPACT IN CASE OF KEY COMPROMISE

(71) Applicant: Ford Global Technologies, LLC, Dearborn, MI (US)

(72) Inventors: Xin Ye, Farmington Hills, MI (US); Venkata Kishore Kajuluri, Southgate, MI (US); Lisa Therese Boran, Northville, MI (US); Bradley Smith, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 17/024,377

(22) Filed: Sep. 17, 2020

(65) Prior Publication Data
US 2022/0086170 A1    Mar. 17, 2022

(51) Int. Cl.
*H04L 9/40* (2022.01)
*G06F 16/28* (2019.01)
*H04L 9/08* (2006.01)
*H04L 9/14* (2006.01)
*H04L 9/32* (2006.01)

(52) U.S. Cl.
CPC .......... *H04L 63/123* (2013.01); *G06F 16/285* (2019.01); *H04L 9/0894* (2013.01); *H04L 9/14* (2013.01); *H04L 9/32* (2013.01); *H04L 9/40* (2022.05); *H04L 63/0435* (2013.01)

(58) Field of Classification Search
CPC ... H04L 63/123; H04L 63/04; H04L 63/0428; H04L 63/06; H04L 9/0894; H04L 9/08; H04L 9/14; H04L 9/32; H04L 12/40; G06F 16/285; H04W 12/06
See application file for complete search history.

(56) References Cited

U.S. PATENT DOCUMENTS

| 5,854,454 A | 12/1998 | Upender et al. |
| 7,307,994 B2 | 12/2007 | Kurita |
| 8,160,251 B1 * | 4/2012 | Koenck ............... H04L 63/0485 455/84 |
| 9,294,412 B2 | 3/2016 | Horvath et al. |

(Continued)

OTHER PUBLICATIONS

Ali Shuja, S., et al., "Secure communication over CANBus", 2017 IEEE 60th International Midwest Symposium on Circuits and Systems (MWSCAS), Boston, MA., 2017, pp. 1264-1267, DOI:10.1109/MWSCAS.2017.8053160.

(Continued)

*Primary Examiner* — Shaqueal D Wade-Wright
(74) *Attorney, Agent, or Firm* — Brandon Hicks; Kilpatrick Townsend & Stockton LLP

(57) ABSTRACT

Systems and methods described herein provide for assigning classifications to signals and corresponding messages for prioritization and transmission across a vehicle CAN bus. The assigned classifications are used to select authentication keys specific to each classification of message. Nodes of the CAN bus can include different sets of keys based on the classifications of messages handled at the nodes. Keys are distributed and localized to reduce any potential impact on critical functions of the vehicle system that may result from compromise of an authentication key.

18 Claims, 8 Drawing Sheets

(56) References Cited

U.S. PATENT DOCUMENTS

| | | |
|---|---|---|
| 10,243,732 B1* | 3/2019 | Herzerg ............... H04L 9/0861 |
| 2003/0070022 A1 | 4/2003 | Ito |
| 2004/0088087 A1 | 5/2004 | Fukushima et al. |
| 2008/0112420 A1 | 5/2008 | Wang et al. |
| 2008/0219252 A1 | 9/2008 | Narasimhaprasad et al. |
| 2010/0138493 A1 | 6/2010 | Natsume |
| 2011/0035521 A1 | 2/2011 | Horihata |
| 2012/0105637 A1 | 5/2012 | Yousefi et al. |
| 2013/0163407 A1 | 6/2013 | Sinha et al. |
| 2014/0022912 A1 | 1/2014 | Kim et al. |
| 2015/0020152 A1* | 1/2015 | Litichever ......... H04L 12/40169 726/1 |
| 2015/0339254 A1 | 11/2015 | Hartwich et al. |
| 2019/0173862 A1* | 6/2019 | Kim ..................... H04L 9/3242 |
| 2020/0211301 A1* | 7/2020 | Zhang ................. H04L 63/065 |
| 2021/0273887 A1* | 9/2021 | Kontani ............... B60R 16/023 |
| 2021/0281400 A1* | 9/2021 | Dai ..................... H04L 9/0825 |
| 2021/0284196 A1* | 9/2021 | Sorensen .............. H04L 63/12 |

OTHER PUBLICATIONS

"CAN security with hidden key generation", CAN *Newsletter 2*, (2016), 6 pages.

Glabbeek, R.V., et al., "Split, Send, Reassemble: A Formal Specification of a CAN Bus Protocol Stack", Electronic Proceedings in Theoretical Computer Science, vol. 244, ISSN 2075-2180, Mar. 2017, p. 14-52, https://arxiv.org/abs/1703.065691.

U.S. Appl. No. 17/024,449 filed Sep. 17 2020, Non-Final Rejection dated Oct. 8, 2021, all pages.

\* cited by examiner

ASSIGNING CATEGORIES FOR MESSAGES AND SYMMETRIC KEY PER CATEGORY TO LOCALIZE THE IMPACT IN CASE OF KEY COMPROMISE

CROSS-REFERENCES TO RELATED APPLICATIONS

This application is related to U.S. Non-Provisional application Ser. No. 17/024,449, filed Sep. 17, 2020 which is herein incorporated by reference in its entirety for all purposes.

BACKGROUND

Vehicle computer systems handle numerous computations and processing loads during operation. Computational tasks performed by vehicle systems such as infotainment, monitoring, and diagnostic processes increase as the complexity and capabilities of such systems increases. Some communications between vehicle systems control safety, functionality, and infotainment features of the vehicle systems and may be authenticated for security against malicious attacks.

SUMMARY

In some embodiments, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method, including assigning a classification of a plurality of classifications to a message for communicating operating information across a vehicle controller area network (CAN) bus. The computer-implemented method also includes authenticating the message using a key, the key selected from a plurality of keys based on the classification. The computer-implemented method also includes transmitting the authenticated message via the CAN bus.

Other embodiments of this aspect include corresponding computer systems, apparatus, and computer programs recorded on one or more computer storage devices, each configured to perform the actions of the methods.

One general aspect includes a vehicle system including an electronic control unit communicatively coupled to one or more electronic control units via a CAN bus of the vehicle system, the electronic control unit including a memory having stored thereon instructions that, upon execution by one or more processors, cause the one or more processors to perform one or more operations. The operations include assigning a classification of a plurality of classifications to a message, where the message includes one or more signals of a plurality of signals, and where the classification is assigned based on the one or more signals. The operations include authenticating the message using a key selected from a plurality of keys based on the classification. The operations also include transmitting the authenticated message across the CAN bus. Other embodiments of this aspect include corresponding computer systems, apparatus, and computer programs recorded on one or more computer storage devices, each configured to perform the actions of the methods.

One general aspect includes a non-transitory computer-readable medium including instructions that, when executed by one or more processors, cause the one or more processors to perform various operations. The operations may include assigning a classification of a plurality of classifications to a message for communicating operating information from an ECU across a vehicle CAN bus. The operations may also include authenticating the message using a key, the key selected from a plurality of keys based on the classification. The operations may also include transmitting the authenticated message via the CAN bus. Other embodiments of this aspect include corresponding computer systems, apparatus, and computer programs recorded on one or more computer storage devices, each configured to perform the actions of the methods.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
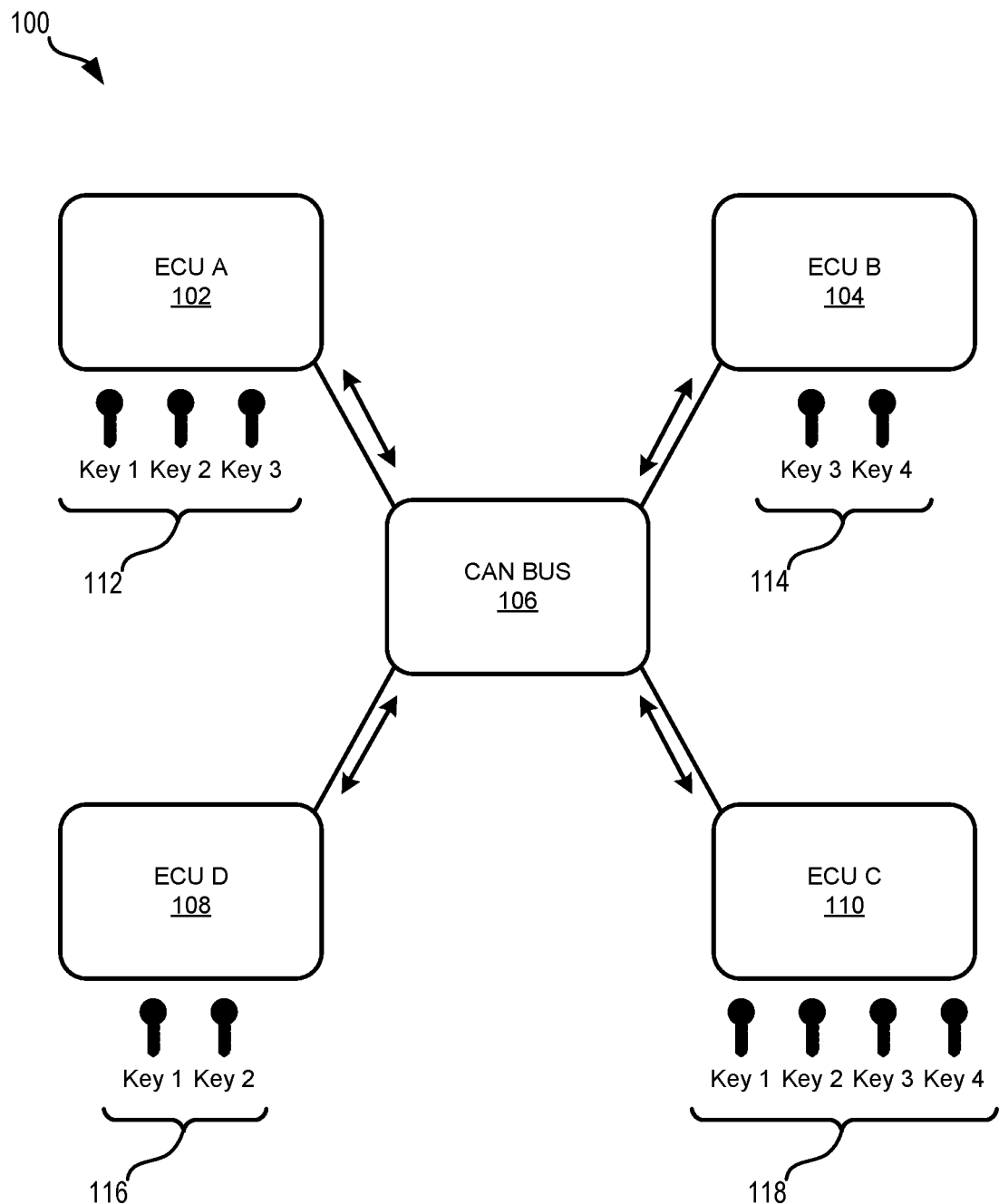
FIG. 1 illustrates a simplified diagram showing interactions between different electronic control units (ECUs) of a vehicle system with key authentication of selected messages, according to some embodiments.

Modern vehicles include many Electronic Control Units (ECUs) communicating with each other and with a vehicle computing system. Implementing message authentication on CAN network is achieved by using symmetric authentication. One important requirement for CAN message authentication is to have the secret key shared between the modules, such as ECUs, that are participating in message authentication. As message authentication uses symmetric authentication, all of the ECUs on the network have the same key shared in between them. This means that if one node is compromised and the key is stolen, then the entire vehicle is at risk. The methods and systems described herein provide for mitigating the impact in case of symmetric key compromise.

In some embodiments, vehicle computing systems may have a process to identify and prioritize the critical messages conveyed across the CAN bus within a vehicle network. A signal rating strategy helps in identifying such critical messages. Individual signals are rated based on various categories based on what the signals are used to control. For example, the categories may include vehicle motion signals, safety signals, security signals, regulatory signals, and non-critical signals. Each signal can only receive one rating, with the rating assigned in order of priority. Various signals can be aggregated together into messages from one node to another node across the CAN bus, each message also assigned a rating based on the ratings of the various signals contained therein. The rating of the message can be assigned based on the highest category of rating assigned to the signals within the message. Once the signals and messages are rated or assigned rating categories, specific symmetric keys are assigned for each rating. For example, all messages rated with respect to a vehicle motion rating will use the same symmetric key for authentication and decryption of the message. This ensures that different critical functions, such as vehicle motion controls, safety controls, and the like are each protected through the use of different symmetric keys ensuring that a potential compromise of a single symmetric key minimizes a potential threat to the system.

In some examples, not all nodes of the vehicle system will transmit or receive messages of all rating categories, and therefore do not all need to store copies of symmetric keys for categories of messages not handled by the node. This further ensures that the security of the nodes is increased by limiting access to the various symmetric keys to those nodes that require the symmetric keys for transmission and reception of messages across the CAN bus.

In particular, the techniques and systems described herein provide several advantages over conventional techniques and systems. For example, overall system security is improved by limiting widespread use of the same keys thereby localizing the use of particular keys and improving message security and resiliency. In case of a key compromise, only messages associated with the particular symmetric key are potentially at risk, not all messages across the CAN bus, improving the resiliency of the system. Additionally, in a case of compromise of an ECU of the vehicle system, only keys stored and handled by the compromised ECU are impacted, such that the threat is localized and minimized. For instance, an ECU which only stores a single symmetric key for one type of rating of messages which may be compromised does not place other types of messages of different ratings at risk. Finally, in one instance, where a critical message or function of the vehicle is compromised, other critical functions of the vehicle system are not at risk or potentially compromised.

Turning now to FIG. 1, a simplified diagram 100 showing interactions between different electronic control units (ECUs) 102, 104, 108, and 110 of a vehicle system with key authentication of selected messages via a CAN bus 106 is illustrated, according to some embodiments. In the simplified diagram 100 shown in FIG. 1, the ECUs 102, 104, 108, and 110 may correspond to different functions of a vehicle system, such as the vehicle system 600 of FIG. 6. The ECUs 102, 104, 108, and 110 are communicatively connected via the CAN bus 106. Each of the ECUs 102, 104, 108, and 110 are responsible for different functions and actions with respect to the vehicle system and those functions and actions may include some critical messages.

Critical messages conveyed across the CAN bus 106 may be categorized into one or more rating categories, such as categories for vehicle motion, safety, security, regulatory, and other such messages. A vehicle motion category may include functions such as brakes, steering, acceleration, engine control, and the like. A safety category may include signals used for safety functions such as restraint controls, headlights, hazard lights, airbags, and other such safety devices. A security category may include signals used for security functions like immobilizers, door locks, perimeter alarm, motion alarm, and other security features. A regulatory category may include signals for regulatory compliance such as emissions data, event data recorders, and other such regulated data. Furthermore, some messages related to non-critical actions may be uncategorized, or categorized as non-critical or not rated. Such uncategorized messages may include messages with respect to an infotainment system or other such non-critical systems.

The categories may be rated in order of priority, as previously assigned or predetermined based on determinations of the most critical messages. For example, in some examples, the categories may be ranked such that vehicle motion ratings are a highest priority, followed by a safety rating, a security category, and a regulatory category, in descending order of priority. Other categories may be rated and assigned priorities within the ranking previously described.

For each message conveyed from an ECU across the CAN bus 106, the message may include more than one signal, for example with each message including signals to control or convey data associated with one or more vehicle systems. Each message, and each signal contained therein can receive a single category, with the rating category made such that a highest priority rating of the signals is used to rate the overall message. The rating of messages based on signal ratings is shown and described in further detail with respect to FIG. 4.

Each category is associated with a symmetric key, such that messages associated with the particular category are authenticated and decrypted using the symmetric key associated with that category. With the message rating and associated symmetric key system described herein, each ECU need only store keys associated with the message ratings transmitted and received by that ECU, as described with respect to FIG. 3 below.

As shown in FIG. 1, ECU A 102 may store and use keys 112 used for authenticating and decrypting messages for ratings associated with the keys 112. As such, ECU A 102 does not store a key for authenticating or decrypting messages associated with key 4. Similarly, ECU B 104 stores keys 114 for authenticating and decrypting messages associated only with key 3 and key 4, ECU D 108 stores keys 116 for messages of category 1 and 2, and ECU C 110 stores keys 118 for messages of category 1, 2, 3, and 4. With this layout and arrangement of keys, if any particular key, such as key 3, is compromised then no messages associated with ECU D 108 or categories 1, 2, or 4 are likewise compromised.

In implementation, each message conveyed across the CAN bus 106 may include an indicator or marker identifying the category of the message, such that the appropriate key can be selected for use in decrypting and implementing the contents of the message. A message from ECU A 102 across CAN bus 106 of category 1 cannot be decrypted at ECU B 104, because key 1 is not stored at ECU B 104. This ensures security of the ECUs 102, 104, 108, and 110 as well as messages transmitted between them.

Figure 2:
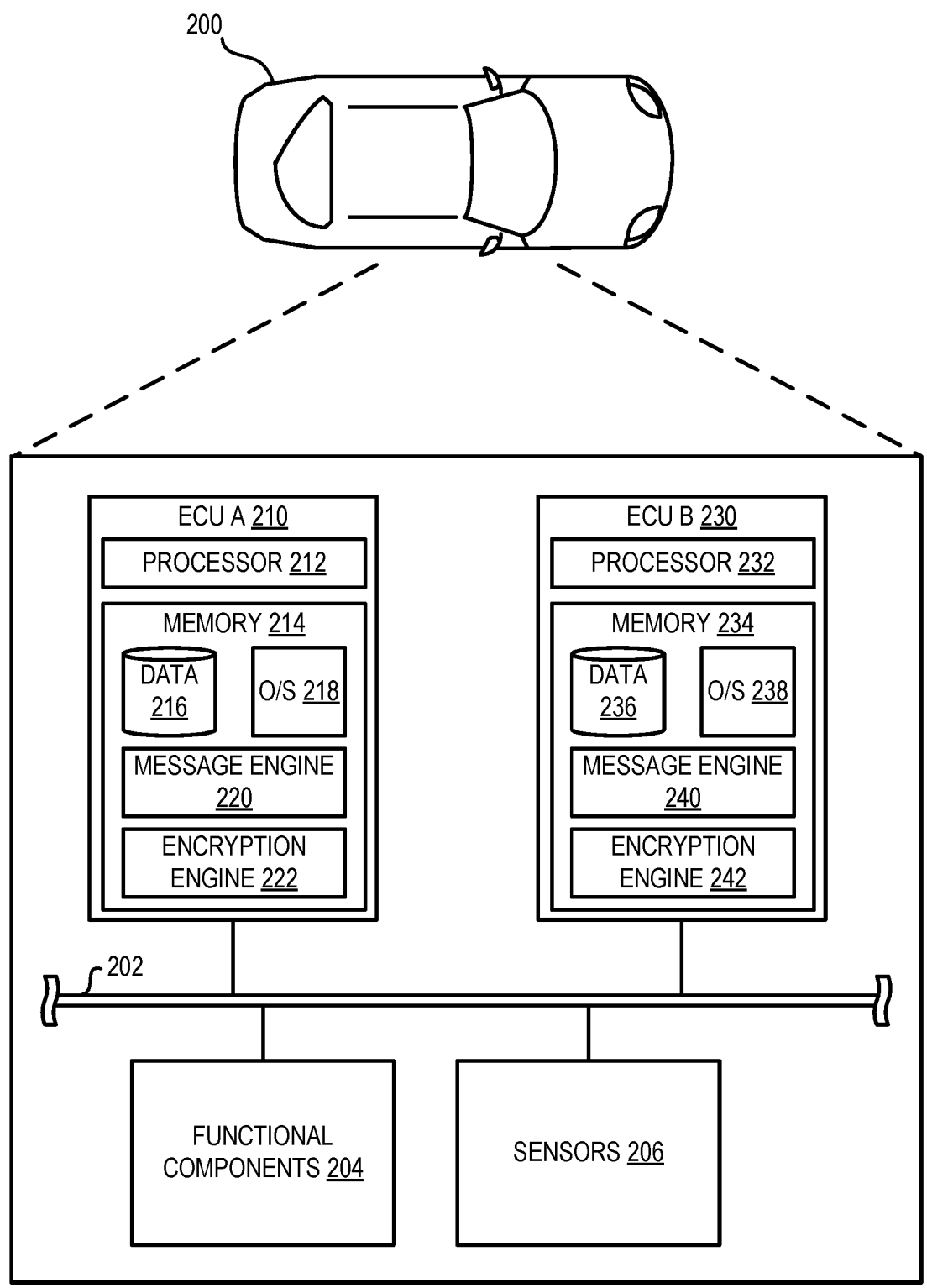
FIG. 2 illustrates a system architecture for a vehicle system involved in assigning categories and symmetric keys for authenticating messages, according to some embodiments.

FIG. 2 illustrates a system architecture for a vehicle system 200 involved in assigning categories and symmetric keys for authenticating messages, according to some embodiments. The vehicle system 200 enables secure transmissions of messages between ECUs 210 and 230. The vehicle system 200 includes computing systems, at least including ECU A 210 and ECU B 230. The vehicle system 200 may be any suitable vehicle system, such as described with respect to FIG. 6. ECU A 210 and ECU B 230 communicate over vehicle CAN bus 202. The CAN bus 202 may also provide communication between functional components 204 and sensors 206 and ECU A 210 and ECU B 230. Functional components 204 may provide functions of the vehicle system 200 such as motion, security, safety, regulatory, and other functions of the vehicle system 200. The sensors 206 may provide data to the ECUs 210 and 230 and to other components of the vehicle system 200 for ensuring proper operation of the vehicle system 200.

In one illustrative configuration, ECU A 210 may include at least one memory 214 and one or more processing units (or processor(s) 212). The processors(s) 212 may be implemented as appropriate in hardware, computer-executable instructions, firmware, or combinations thereof. Computer-executable instructions or firmware implementations of the processor(s) 212 may include computer-executable or machine executable instructions written in any suitable programming language to perform the various functions described. ECU B 230 may also include a memory 234 and processor(s) 232 similar to the memory 214 and processor 212 of ECU A 210.

The memory 214 and 234 may each store program instructions that are loadable and executable on the processor(s) 212 and 232, as well as data generated during the execution of these programs. Depending on the configuration and whether implemented within an ECU or a stand-alone computing system, the memory 214 and 234 may be volatile (such as random access memory (RAM)) and/or non-volatile (such as read-only memory (ROM), flash memory, etc.). In some implementations, the memory 214 and 234 may include multiple different types of memory, such as static random access memory (SRAM), dynamic random access memory (DRAM) or ROM.

Turning to the contents of the memory 214 and 234, each may include identical or similar components, as described below. For example, database 216 and 236, operating system 218 and 238, message engine 220 and 240, and authentication engine 222 and 242 may each include similar components and elements. Though only one of each of the components may be described below, each of the similar elements may include similar components. In more detail, the memory 214 may include an operating system 218 and one or more application programs or engines for implementing the features disclosed herein including at the message engine 220 and the authentication engine 222. The memory 214 may also include system data (not shown), which provides information to be processed by and/or consumed by the engines 220-222.

For the purposes of this disclosure, any of the engines 220-222 may be any set of computer executable instructions installed upon, and executed from, a computing system of the vehicle system 200, such as a computing system of ECU A 210 or ECU B 230. Engines 220-222 may be installed on any of the computing systems described herein by a manufacturer or by another entity. In some embodiments, the engines 220-222 may cause the elements of the vehicle system 200 to establish a communication session with another one of the elements of the vehicle system 200.

In accordance with at least some embodiments, the message engine 220 may be configured to generate messages including one or more signals for communicating information across the CAN bus 202. The message engine 220 may be configured to determine a rating of one or more signals as well as a rating of one or more messages conveyed from the ECU across the CAN bus 202. The message engine 220 may provide signal and message ratings as described with respect to FIG. 4 below.

In accordance with at least some embodiments, the authentication engine 222 may be configured to authenticate and decrypt messages and data exchanged between elements of vehicle system 200 over CAN bus 202. The authentication engine 222 is configured to generate or access a stored symmetric key for authenticating data contained in a message.

In accordance with at least some embodiments, the authentication engine 222 may include separate sub-engines for authentication and decryption, which may share a common communication interface and/or common libraries. The database 216 may comprise any suitable persistent data storage system. In some embodiments, the database 216 may be stored in a database. Information stored in the database 216 may be accessed by the authentication engine 222 via a database query or any other suitable data retrieval means.

In some embodiments, the authentication engine 222 may, in conjunction with the processor 212, be configured to authenticate data provided to it. For example, the authentication engine 222 may be configured to decrypt an authenticated foreign key or an authenticated message authenticated with a symmetric key that is provided to it or stored in the memory 214, as well authenticated data from a source table. In some embodiments, the authentication engine 222 may execute when it receives a request command (e.g., a call to an authentication or decryption function) that provides data to be authenticated or decrypted. In some embodiments, the data to be decrypted may be passed to the authentication engine 222 as a parameter of a function call. The authentication engine 222 may be provided with an authentication and/or decryption key as a parameter of a function call. The key may include any symmetric key, in particular a symmetric key associated with a rating of a message received at the ECU A 210.

In some embodiments, the authentication engine 222 may perform a database lookup to identify a key. In some embodiments, the authentication engine 222 may utilize a hard-coded authentication/decryption key and/or authentication algorithm. The authentication engine 222 may utilize any suitable authentication or decryption algorithm for encoding data within database 216 or received or sent from ECU A 210. In some embodiments, the authentication engine 222 may comprise a hardware security module (HSM), capable of that safeguarding and managing digital keys for strong authentication and cryptoprocessing. A hardware security module may be a physical computing device configured to safeguard and manage digital keys for strong authentication. The hardware security module may also be configured to provide cryptoprocessing.

In some embodiments, the database 216 may comprise information to be associated with various functions and actions of the vehicle system 200. The database 216 may include a source table and one or more searchable tables, each associated with particular data or information. In some embodiments, the database 216 may comprise at least some ciphertext data and at least some plaintext data.

Figure 3:
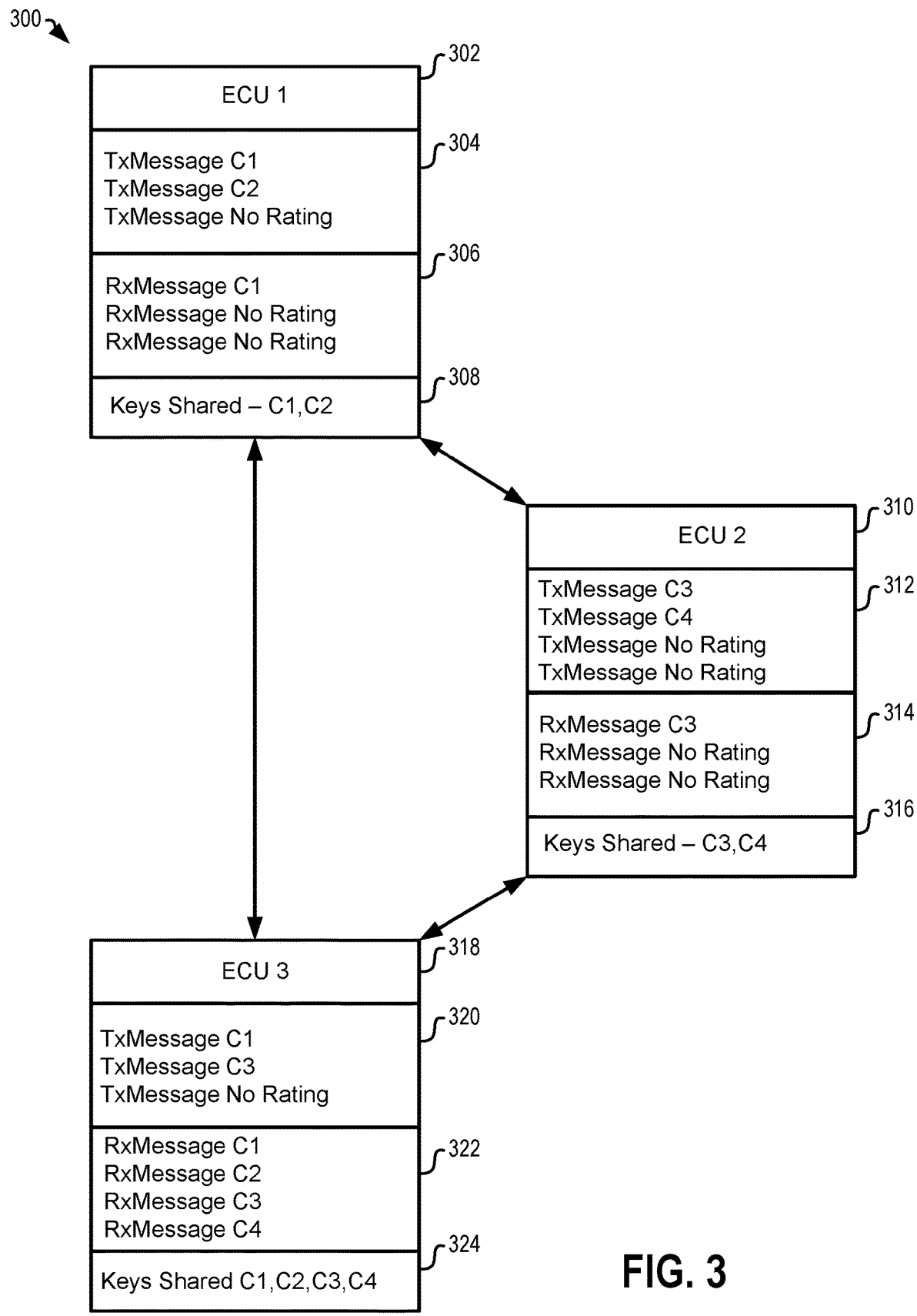
FIG. 3 illustrates a block diagram showing ECUs of a vehicle system with various ratings and keys, according to some embodiments.

FIG. 3 illustrates a block diagram 300 showing ECUs 302, 310, and 318 of a vehicle system with various ratings and keys, according to some embodiments. The vehicle system may be the vehicle system 200 or vehicle system 600 as described herein. Each ECU 302, 310, and 318 may correspond to different ECUs of the vehicle system. ECU 1 302 transmits messages 304, receives messages 306, and shows keys 308 stored at ECU 1 302. ECU 2 310 transmits messages 312, receives messages 314, and shows keys 316 stored at ECU 2 310. ECU 3 318 transmits messages 320, receives messages 322, and shows keys 324 stored at ECU 3 318. The keys stored at each of the ECUs 302, 310, and 318 are reflective of the categories of messages handled, either received or transmitted, by each ECU.

Each ECU on the CAN bus network does not share the same keys, with ECU 1 302 storing keys associated with category 1 and category 2, ECU 2 310 storing keys associated with category 3 and category 4, and ECU 3, 318 storing keys associated with category 1, 2, 3, and 4. Since each ECU communicates messages associated with a subset of the keys, the keys are only distributed as needed to ECUs requiring the keys.

Figure 4:
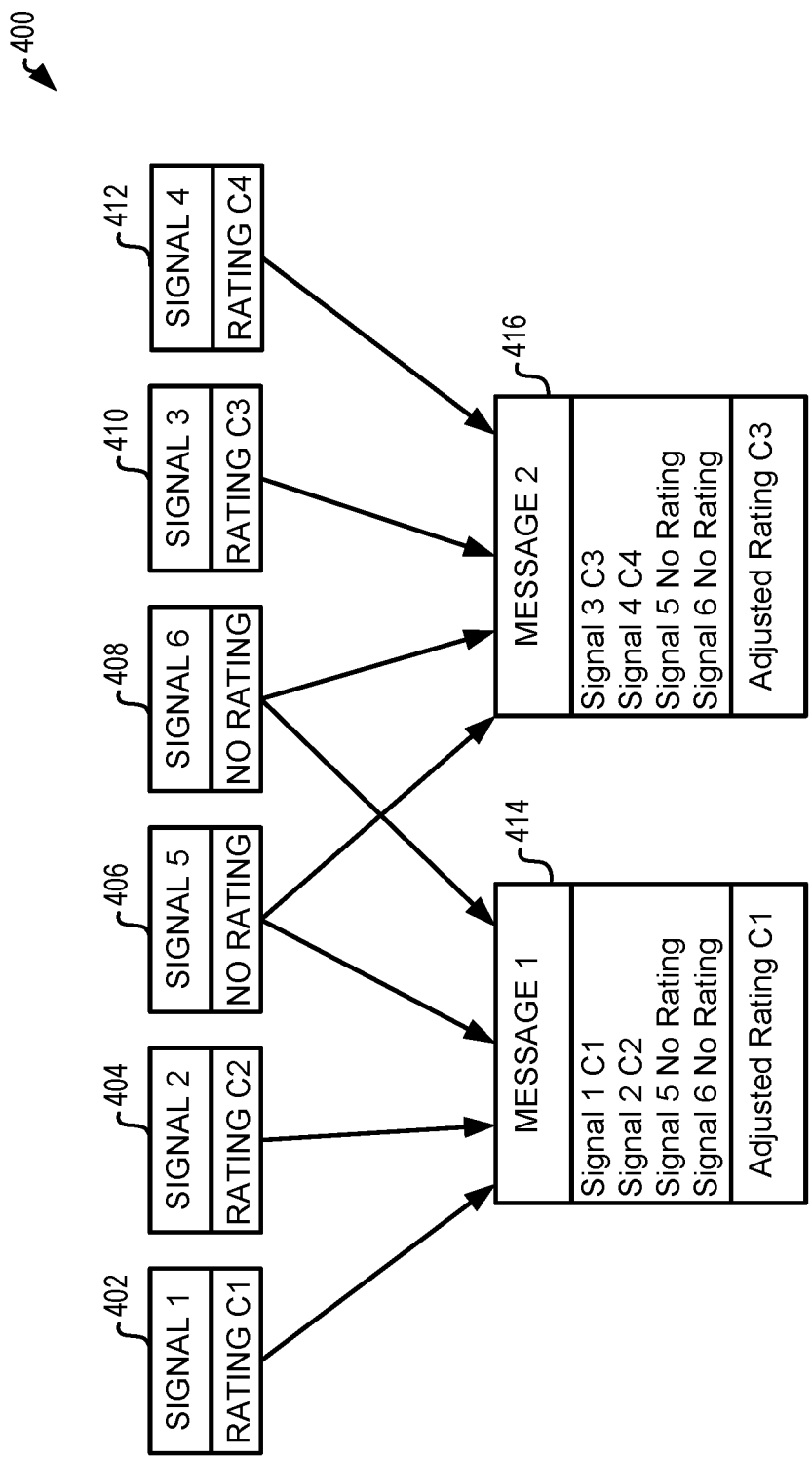
FIG. 4 illustrates a block diagram showing a message formed of various signals with different ratings, according to some embodiments.

FIG. 4 illustrates a block diagram 400 showing messages 414 and 416 including various signals with different ratings, according to some embodiments. The ratings of each signal and the adjusted rating of each message 414 and 416 is also indicated in FIG. 4, illustrating how categories of messages may be assigned to preserve a ranking of priority with respect to critical messages, and to prioritize critical over non-critical messages.

The signals 402-412 each have different ratings based on the contents of each signal. As described previously, the ratings may be assigned based on the functions controlled or affected by the signals, for example including vehicle motion signals, security signals, safety signals, and regulatory signals. Each signal may be classified to one of a plurality of the categories, including an unrated category for non-critical messages.

Each message 414 and 416 can carry multiple signals that belong to different categories or signals that do not fall into any of the listed categories. Accordingly, the signal rating of signals contained within the message can be used to assign an overall rating to messages 414 and 416. In one example, the category of the messages 414 and 416 can be assigned based on the highest category of signal rating as the message category. For example, a message 414 and 416 can contain one C1, one C2 and multiple unrated signals. In this example, the rating of the message 414 can be assigned as the highest priority signal rating contained within the message 414. In this example, the rating of the message 414 may receive a rating of C1, corresponding to the highest priority rating of the signals, particularly of signal 1 402. Additionally, message 2 416 will receive a rating of C3, corresponding to the highest rating of a signal contained therein, namely signal 3 410.

Once messages 414 and 416 are assigned ratings, as described above, particular symmetric keys are associated with each category of rating. In particular, every C1 category message will share a symmetric key, C2 category messages will share a symmetric key, though different from the symmetric key of C1. Messages carrying different signals for different critical functions are authenticated and decrypted using different keys, such that the functions are localized and isolated from one another.

Figure 5:
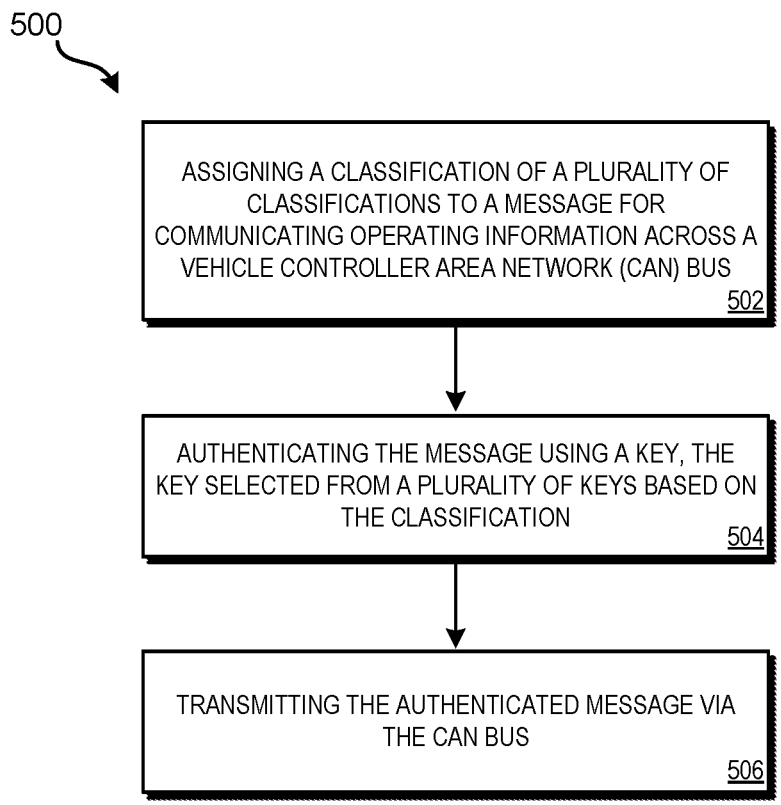
FIG. 5 illustrates a method for assigning classifications and symmetric keys to messages across a CAN bus, according to some embodiments.

FIG. 5 illustrates a method for assigning classifications and symmetric keys to messages across a CAN bus, according to some embodiments. The method 500 may be performed by, for example, a computing system such as a computing system of the vehicle system 200, ECU A 210, ECU B 230, or may be performed by the computing system 602 of the vehicle system 600 of FIG. 6 or potentially by a cloud computing system 800 of FIG. 8. Though the steps of method 500 are presented in sequential order, some or all of the steps may be performed in different sequences, including simultaneously, in some examples.

At step 502, a computing device of the vehicle system 200 assigns a classification of a plurality of classifications to a message for communicating operating information across a vehicle CAN bus. The computing device assigns the classification to the message based on the contents of the message, including various signals, or a source of the contents of the message. For example, the message may include information or signals categorized as critical or non-critical based on the contents thereof. In some examples, the critical signals may relate to priority messages and information critical to the operation of the vehicle system 200. The critical signals may further be categorized within a ranked priority, such that signals relating to higher priority functions, such as vehicle motion are prioritized over signals relating to regulatory or security functions. The rating of the message may be assigned or selected based on the highest priority rating assigned to a signal included in the message. Messages which are rated as non-critical are also identified, based on inclusion of signals that are all rated as non-critical, and may not be authenticated, according to step 504 below due to the lack of a critical rating. This can preserve computing resources and prevent unnecessary authentication and decryption of messages and signals that are peripheral to or not necessary for functions of the vehicle, including for example infotainment systems and related subsystems.

At step 504, the computing device authenticates the message using a key, the key selected from a plurality of keys based on the classification. The key may be a symmetric key, or any other form of key used for authentication of information transmitted across the CAN bus. The key is selected based on the classification of the message as assigned at step 502. In an example, the key is associated with a particular rating and only used to authenticate or decrypt messages of that particular rating. For instance, messages categorized as C1 may be authenticated using a key associated with category C1.

At step 506, the computing device transmits the authenticated message via the CAN bus. The authenticated message is transmitted from a first module, such as ECU A 210, to a second module, such as ECU B 230. The authenticated message may only be conveyed to a particular ECU and/or module configured to receive and decrypt the particular message. In addition, the message may include additional information such as freshness value information and message authentication information. In some examples, the message may also include an indication of the rating of the message, such that an appropriate key can be selected for decryption of the message, from among a plurality of keys stored at a receiving module.

Figure 6:
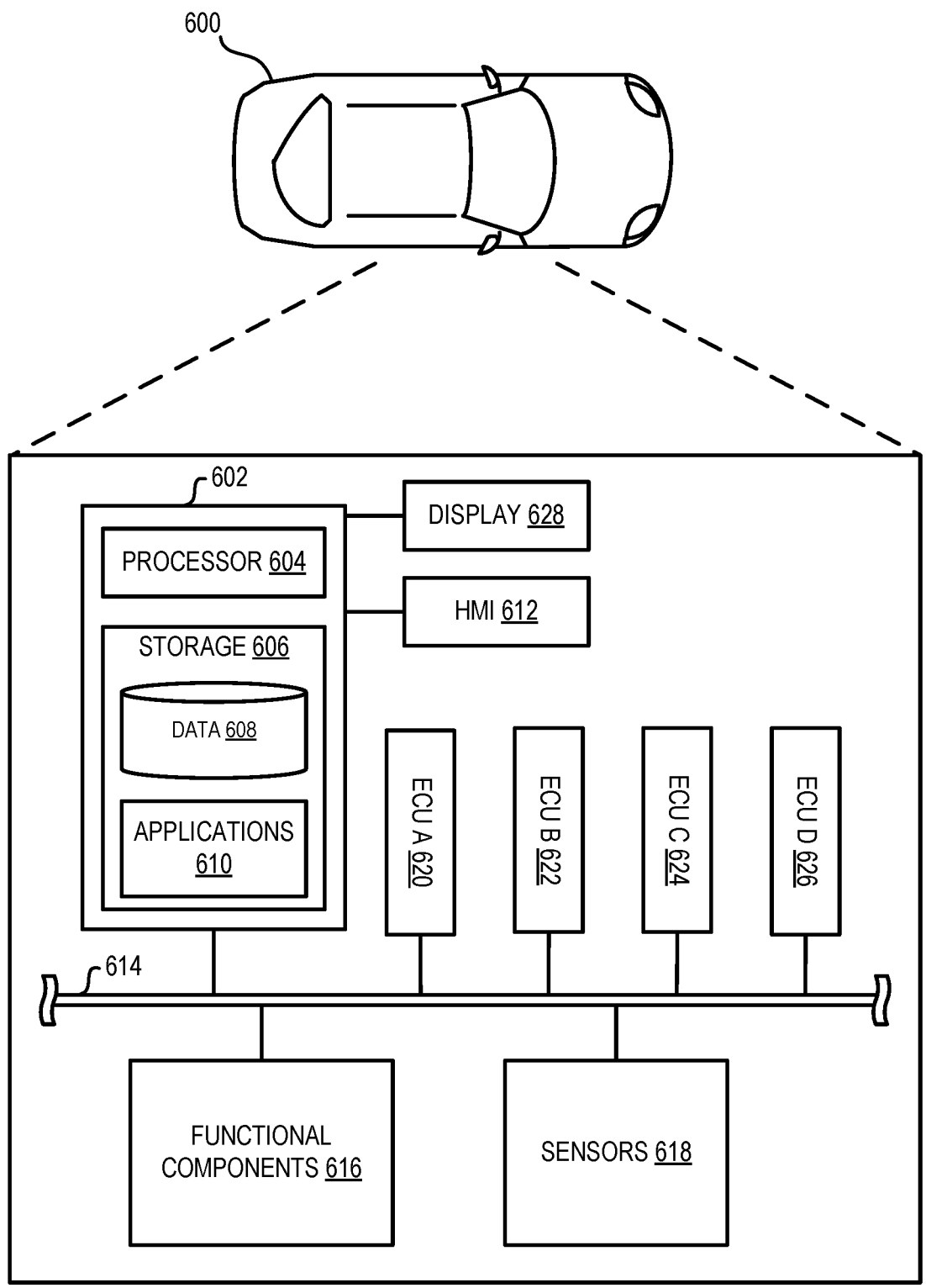
FIG. 6 illustrates a block diagram of a vehicle system, according to some embodiments.
Figure 7:
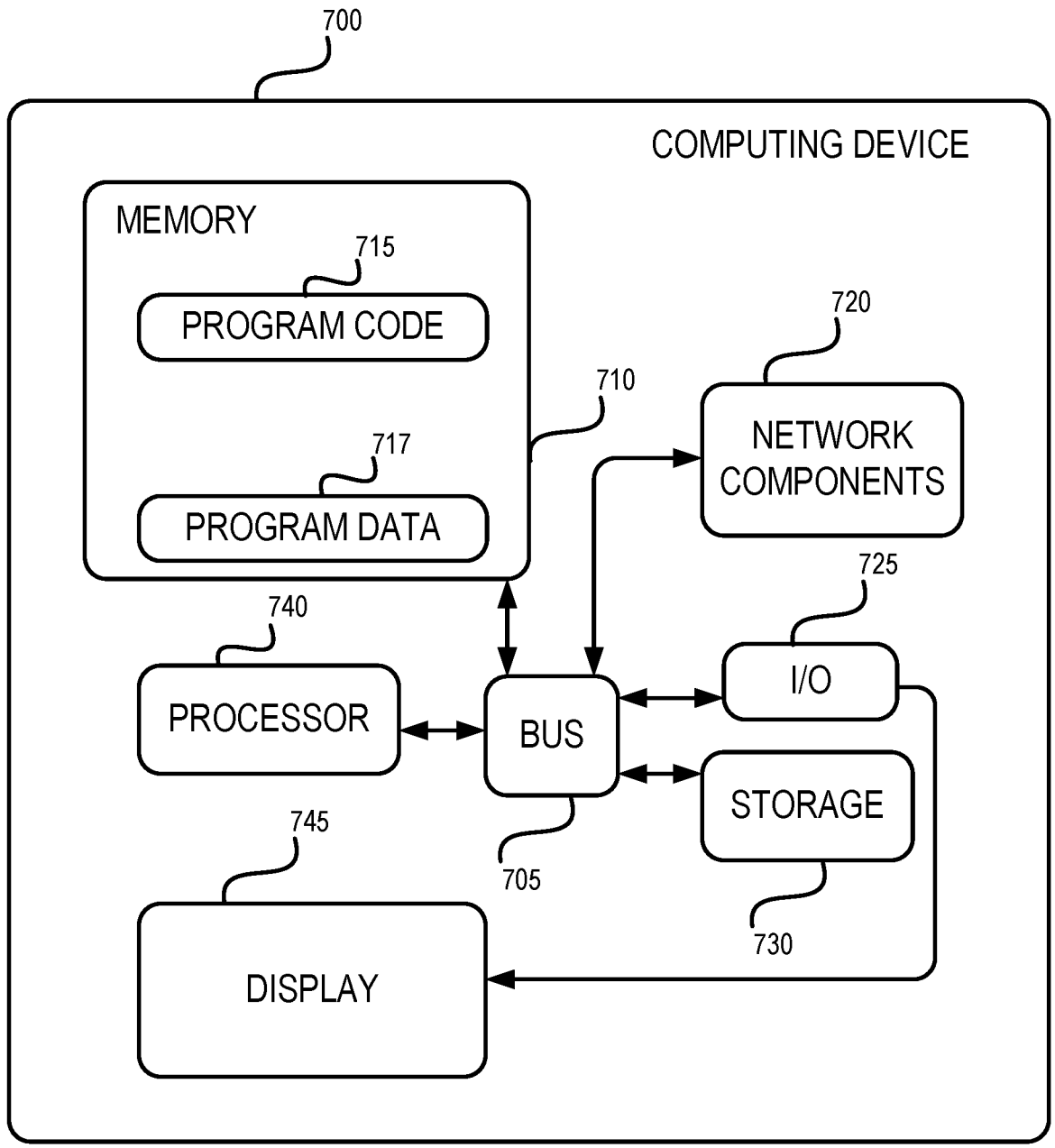
FIG. 7 illustrates a block diagram of a computing system, according to some embodiments.

Any suitable computing system or group of computing systems can be used for performing the operations or methods described herein. For example, FIG. 6 illustrates a vehicle system including a computing system 602 as well as multiple ECUs which may perform some or all of the functions described herein. FIG. 7 further depicts an example of a computing device 700 that may be at least a portion of computing system 602.

FIG. 6 illustrates a block diagram of a vehicle system 600, according to some embodiments. The vehicle system 600 may include a computing system 602 configured to communicate over an in-vehicle network 614. The computing system 602 includes a processor 604 and storage 606. While a vehicle system 600 is shown in FIG. 6, the example components as illustrated are not intended to be limiting. Indeed, the vehicle system 600 may have more or fewer components, and additional or alternative components and/or implementations may be used. It should be noted that the use of a vehicle system 600 environment is illustrative, as the components and/or functionality may be utilized in other types of systems such as flight control system in an airplane, or a medical device or industrial machine.

The vehicle system 600 may include various types of automobile, crossover utility vehicle (CUV), sport utility vehicle (SUV), truck, recreational vehicle (RV), boat, plane or other mobile machine for transporting people or goods. In many cases, the vehicle system 600 may be powered by an internal combustion engine. As another possibility, the vehicle system 600 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of the vehicle system 600 may vary, the capabilities of the vehicle system may correspondingly vary. As some other possibilities, vehicle system 600 may have different capabilities with respect to passenger capacity, towing ability and capacity, and storage volume.

The computing system 602 may include a Human Machine Interface (HMI) 612 and a display 628 for user interaction with the computing system 602. An example computing system 602 may be the SYNC™ system provided by FORD MOTOR COMPANY™ of Dearborn, Mich. In some examples the display 628 may include a vehicle infotainment system including one or more displays. The HMI 612 may be configured to support voice command and BLUETOOTH™ interfaces with the driver and driver carry-on devices, receive user input via various buttons or other controls, and provide vehicle status information to a driver or other vehicle system 600 occupants. For instance, the computing system 602 may interface with one or more buttons or other HMI 612 configured to invoke functions on the computing system 602 (e.g., steering wheel audio buttons, a push-to-talk button, instrument panel controls, etc.).

The computing system 602 may also drive or otherwise communicate with the display 628 configured to provide visual output to vehicle occupants, e.g., by way of a video controller. In some cases, the display 628 may be a touch screen further configured to receive user touch input via the video controller, while in other cases the display 628 may be a display only, without touch input capabilities. In an example, the display 628 may be a head unit display included in a center console area of the vehicle system 600. In another example, the display 628 may be a screen of a gauge cluster of the vehicle system 600.

The computing system 602 may further include various types of computing apparatus in support of performance of the functions of the computing system 602 described herein. In an example, the computing system 602 may include one or more processors 604 configured to execute computer instructions, and a storage 606 medium on which computer-executable instructions and/or data may be maintained. A computer-readable medium (also referred to as a processor-readable medium or storage 606) includes any non-transitory (e.g., tangible) medium that participates in providing data (e.g., instructions) that may be read by a computer (e.g., by the one or more processors 604). In general, the processor 604 receives instructions and/or data, e.g., from the storage 606, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc. The storage 606 may include divisions for data 608 and applications 610. The data 608 may store information such as databases and other such information. The applications 610 may store the computer-executable instructions or other such instructions executable by the processor 604.

The computing system 602 may be configured to communicate with mobile devices of the vehicle system 600 occupants. The mobile devices may be any of various types of portable computing device, such as cellular phones, tablet computers, smart watches, laptop computers, portable music players, or other devices capable of communication with the computing system 602. As with the computing system 602, the mobile device may include one or more processors configured to execute computer instructions, and a storage medium on which the computer-executable instructions and/or data may be maintained. In some examples, the computing system 602 may include a wireless transceiver (e.g., a BLUETOOTH™ controller, a ZIGBEE™ transceiver, a Wi-Fi transceiver, etc.) configured to communicate with a compatible wireless transceiver of the mobile device. Additionally, or alternately, the computing system 602 may communicate with the mobile device over a wired connection, such as via a USB connection between the mobile device and a Universal Serial Bus (USB) subsystem of the computing system 602.

The computing system 602 may be further configured to communicate with other components of the vehicle system 600 via one or more in-vehicle networks 614. The in-vehicle networks 614 may include one or more of a vehicle CAN, an Ethernet network, or a media oriented system transfer (MOST), as some examples. The in-vehicle networks 614 may allow the computing system 602 to communicate with other units of the vehicle system 600, such as ECU A 620, ECU B 622, ECU C 624, and ECU D 626. The ECUs 620, 622, 624, and 626 may include various electrical or electromechanical systems of the vehicle system 600 or control various subsystems of the vehicle system 600. Some non-limiting examples of ECUs include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle system 600); a radio transceiver module configured to communicate with key fobs or other vehicle system 600 devices, a climate control management module configured to provide control and monitoring of heating and cooling system components (e.g., compressor clutch and blower fan control, temperature sensor information, etc.) as well as a transmission control module, a brake control module, a central timing module, a suspension control module, a vehicle modem (which may not be present in some configurations), a global positioning system (GPS) module configured to provide vehicle system 600 location and heading information, and various other vehicle ECUs configured to corporate with the computing system 602. The subsystems controlled by the various ECUs may include functional components 616 of the vehicle system 600 including elements such as the powertrain, engine, brakes, lights, steering components, and the like. Additionally, some or all of the functional components 616 may include sensors 618 as well as additional sensors equipped to the vehicle system 600 for detecting various states, positions, proximity, temperature, and the like of the vehicle system 600 and subsystems thereof. The ECUs 620, 622, 624, 626 may communicate with the computing system 602 as well as the functional components 616 and the sensors 618 over the in-vehicle network 614. While only four ECUs are depicted in FIG. 6, any number (more or fewer) of ECUs may be included in vehicle system 600.

FIG. 7 illustrates a block diagram of an example of a computing device 700. Computing device 700 can be any of the described computers herein including, for example, computing system 602 within the vehicle system 600 of FIG. 6 as well as ECUs 620, 622, 624, 626. The computing device 700 can be or include, for example, an integrated computer, a laptop computer, desktop computer, tablet, server, or other electronic device.

The computing device 700 can include a processor 740 interfaced with other hardware via a bus 705. A memory 710, which can include any suitable tangible (and non-transitory) computer readable medium, such as RAM, ROM, EEPROM, or the like, can embody program components (e.g., program code 715) that configure operation of the computing device 700. Memory 710 can store the program code 715, program data 717, or both. In some examples, the computing device 700 can include input/output ("I/O") interface components 725 (e.g., for interfacing with a display 745, keyboard, mouse, and the like) and additional storage 730.

The computing device 700 executes program code 715 that configures the processor 740 to perform one or more of the operations described herein. Examples of the program code 715 include, in various embodiments logic flowchart described with respect to FIG. 1 above. The program code 715 may be resident in the memory 710 or any suitable computer-readable medium and may be executed by the processor 740 or any other suitable processor.

The computing device 700 may generate or receive program data 717 by virtue of executing the program code 715. For example, sensor data, trip counter, authenticated messages, trip flags, and other data described herein are all examples of program data 717 that may be used by the computing device 700 during execution of the program code 715.

The computing device 700 can include network components 720. Network components 720 can represent one or more of any components that facilitate a network connection. In some examples, the network components 720 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network). In other examples, the network components 720 can be wired and can include interfaces such as Ethernet, USB, or IEEE 1394.

Although FIG. 7 depicts a computing device 700 with a processor 740, the system can include any number of computing devices 700 and any number of processor 740. For example, multiple computing devices 700 or multiple processor 740 can be distributed over a wired or wireless network (e.g., a Wide Area Network, Local Area Network, or the Internet). The multiple computing devices 700 or multiple processor 740 can perform any of the steps of the present disclosure individually or in coordination with one another.

Figure 8:
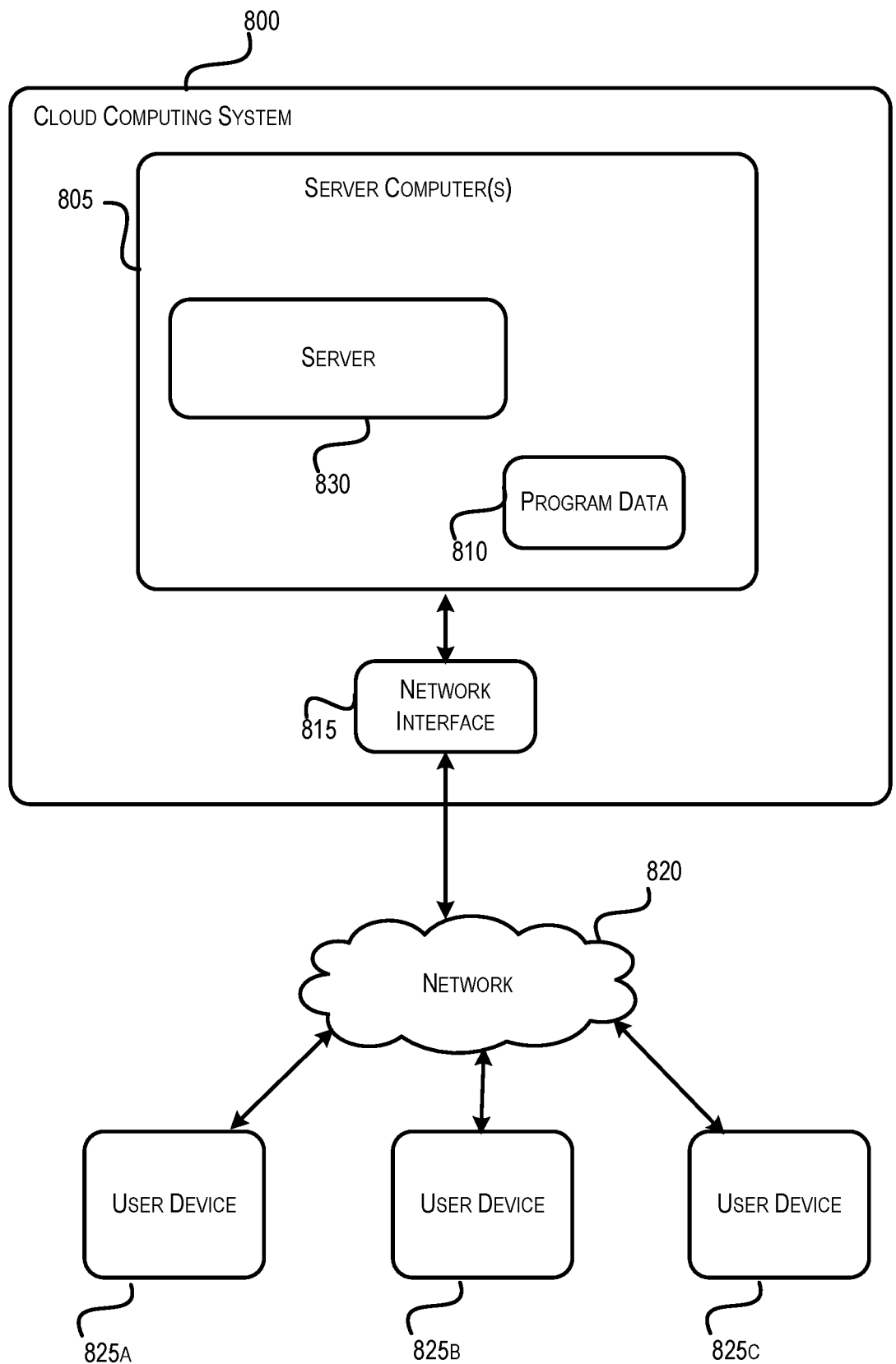
FIG. 8 illustrates a cloud computing system, according to some embodiments.

In some embodiments, the functionality provided by the computing device 800 may be offered as cloud services by a cloud service provider. For example, FIG. 8 depicts an example of a cloud computing system 800 offering an intelligence service that can be used by a number of user subscribers using user devices 825a, 825b, and 825c across a data network 820. User devices 825a, 825b, and 825c could be examples of a vehicle system 600 described above. In the example, the intelligence service may be offered under a Software as a Service (SaaS) model. One or more users may subscribe to the intelligence service, and the cloud computing system performs the processing to provide the intelligence service to subscribers. The cloud computing system may include one or more remote server computers 805.

The remote server computers 805 include any suitable non-transitory computer-readable medium for storing program code (e.g., server 830) and program data 810, or both, which is used by the cloud computing system 800 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 805 can include volatile memory, non-volatile memory, or a combination thereof.

One or more of the server computers 805 execute the program data 810 that configures one or more processors of the server computers 805 to perform one or more of the operations that determine locations for interactive elements and operate the adaptive rule-based system. As depicted in the embodiment in FIG. 8, the one or more server computers 805 provide the services to perform the adaptive rule-based system via the server 830. Any other suitable systems or subsystems that perform one or more operations described herein (e.g., one or more development systems for configuring an interactive user interface) can also be implemented by the cloud computing system 800.

In certain embodiments, the cloud computing system 800 may implement the services by executing program code and/or using program data 810, which may be resident in a memory device of the server computers 805 or any suitable computer-readable medium and may be executed by the processors of the server computers 805 or any other suitable processor.

In some embodiments, the program data 810 includes one or more datasets and models described herein. Examples of these datasets include dealership data, classification data, etc. In some embodiments, one or more of data sets, models, and functions are stored in the same memory device. In additional or alternative embodiments, one or more of the programs, data sets, models, and functions described herein are stored in different memory devices accessible via the data network 820.

The cloud computing system 800 also includes a network interface device 815 that enable communications to and from cloud computing system 800. In certain embodiments, the network interface device 815 includes any device or group of devices suitable for establishing a wired or wireless data connection to the data networks 820. Non-limiting examples of the network interface device 815 include an Ethernet network adapter, a modem, and/or the like. The server 830 is able to communicate with the user devices 825a, 825b, and 825c via the data network 820 using the network interface device 815.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A vehicle system comprising:
a first electronic control unit communicatively coupled to one or more electronic control units via a Controller Area Network (CAN) bus of the vehicle system, the first electronic control unit comprising a memory having stored thereon instructions that, upon execution by one or more processors, cause the one or more processors to:
store a first set of one or more keys in the memory of the first electronic control unit based on one or more classifications associated with signals that the first electronic control unit is configured to send or receive, wherein the first set of one or more keys exclude a second set of one or more keys stored at a memory of a second electronic control unit; and wherein the second set of one or more keys is associated with a second classification, and wherein the first electronic control unit is unable to receive or transmit a second message with the second classification;
assign a classification of a plurality of classifications to a message, wherein the message comprises one or more signals of a plurality of signals, and wherein the classification is assigned based on the one or more signals;
retrieve, from the memory of the first electronic control unit, a key associated with the classification of the message;
authenticate the message using the key selected from the first set of one or more keys based on the classification of the message; and
transmit the authenticated message across the CAN bus.

2. The vehicle system of claim 1, wherein each of the plurality of classifications is associated with a distinct key for authenticating the message.

3. The vehicle system of claim 1, wherein the instructions to assign the classification comprise further instructions that, upon execution by the one or more processors, cause the one or more processors to:
assign a respective classification to each of the one or more signals of the message; and
assign the classification based on the one or more respective classifications.

4. The vehicle system of claim 3, wherein the instructions to assign the classification comprise further instructions that, upon execution by the one or more processors, cause the one or more processors to:
select the classification of the one or more signals based on a rank of the classifications.

5. The vehicle system of claim 4, wherein the classification is selected based on the rank of the classification being higher than a rank of another classification.

6. The vehicle system of claim 1, wherein the instructions further cause the processor to:
assign an unclassified classification of the plurality of classifications to a second message; and
not authenticating the second message prior to transmitting the second message.

7. A computer-implemented method, comprising:
storing a first set of one or more keys in a memory of a first electronic control unit based on one or more classifications associated with signals that the first electronic control unit is configured to send or receive, wherein the first set of one or more keys exclude a second set of one or more keys stored at a memory of a second electronic control unit; and wherein the second set of one or more keys is associated with a second classification, and wherein the first electronic control unit is unable to receive or transmit a second message with the second classification;

assigning a classification of a plurality of classifications to a message for communicating operating information across a vehicle Controller Area Network (CAN) bus;

retrieving, from the memory of the first electronic control unit, a key associated with the classification of the message;

authenticating the message using the key, the key selected from the first set of one or more keys based on the classification of the message; and transmitting the authenticated message via the CAN bus.

8. The computer-implemented method of claim 7, wherein the each of the plurality of keys are symmetric keys.

9. The computer-implemented method of claim 7, wherein assigning the classification comprises determining a classification for one or more signals of the message, and wherein the classification of the message is assigned based on the classification of the one or more signals of the message.

10. The computer-implemented method of claim 7, wherein the authenticated message comprises data identifying the classification of the message.

11. The computer-implemented method of claim 7, wherein the classification of the message is selected from:
a vehicle motion classification;
a safety classification;
a security classification;
a regulatory classification; or
unclassified.

12. The computer-implemented method of claim 7, further comprising:
assigning an unclassified classification to a second message, and
not authenticating the second message prior to transmitting the second message in response to the unclassified classification.

13. The computer-implemented method of claim 7, wherein assigning the classification comprises:
determining a classification of one or more signals included in the message; and
assigning the classification based on a rank of the classification of one of the one or more signals.

14. A non-transitory computer-readable medium comprising instructions that, when executed by one or more processors, cause the one or more processors to:

store a first set of one or more keys in a memory of a first electronic control unit based on one or more classifications associated with signals that the first electronic control unit is configured to send or receive, wherein the first set of one or more keys exclude a second set of one or more keys stored at a memory of a second electronic control unit; and wherein the second set of one or more keys is associated with a second classification, and wherein the first electronic control unit is unable to receive or transmit a second message with the second classification;

assign a classification of a plurality of classifications to a message for communicating operating information from an electronic control unit (ECU) across a vehicle Controller Area Network (CAN) bus;

retrieve, from the memory of the first electronic control unit, a key associated with the classification of the message;

authenticate the message using, the key selected from the first set of one or more keys based on the classification of the message; and transmit the authenticated message via the CAN bus.

15. The non-transitory computer-readable medium of claim 14, wherein the instructions to assign the classification comprise further instructions that, upon execution by the one or more processors, cause the one or more processors to:
assign a signal classification of one or more signals included in the message;
assign the signal classification of at least one of the one or more signals based on a rank of the signal classification as the classification of the message.

16. The non-transitory computer-readable medium of claim 14, wherein the classification is selected from:
a vehicle motion classification;
a safety classification;
a security classification;
a regulatory classification; or
unclassified.

17. The non-transitory computer-readable medium of claim 14, wherein the instructions further cause the one or more processors to:
assign an unclassified classification of the plurality of classifications to a second message; and
not authenticating the second message prior to transmitting the second message.

18. The non-transitory computer-readable medium of claim 14, wherein the plurality of keys are each symmetric keys and each key of the plurality of keys is associated with a particular classification.

* * * * *